United States Patent [19]

Toyomura

[11] Patent Number: 4,486,759
[45] Date of Patent: Dec. 4, 1984

[54] ELECTRONIC EQUIPMENT
[75] Inventor: Shigeru Toyomura, Kawasaki, Japan
[73] Assignee: Canon Kabushiki Kaisha, Tokyo, Japan
[21] Appl. No.: 389,556
[22] Filed: Jun. 17, 1982
[51] Int. Cl.³ ............................................. G01D 15/10
[52] U.S. Cl. .................. 346/76 PH; 307/66; 219/216; 400/120
[58] Field of Search ............ 346/76 PH; 219/216 PH; 400/120; 307/64, 66, 85; 365/229

[56] References Cited
U.S. PATENT DOCUMENTS 3,859,638  1/1975  Hume, Jr. ............................ 365/229
3,934,695  1/1976  Kovalick ........................ 346/76 PH
4,168,421  9/1979  Ito ................................... 346/76 PH Primary Examiner—E. A. Goldberg
Assistant Examiner—Todd E. DeBoer
Attorney, Agent, or Firm—Fitzpatrick, Cella, Harper & Scinto

[57] ABSTRACT

Electronic equipment has a switch for selecting a internal power supply contained therein or an external power supply connected through a connecting terminal and detecting means for detecting the switching of the switch. When the switching of the switch is detected, at least one function of the electronic equipment is inhibited.

7 Claims, 3 Drawing Figures

ELECTRONIC EQUIPMENT

BACKGROUND OF THE INVENTION

1. Field of the Invention

The present invention relates to electronic equipment, and more particularly to an electronic equipment which is selectively powered by an internal battery power supply and an external power supply connected through an external connecting terminal, in accordance with the setting of a selection switch.

2. Description of the Prior Art

In prior art electronic equipment which adopts a two-way power supply system, such as an electronic desk top calculator, either a battery power supply or an external power supply is selected by a power switch to operate an arithmetic unit and other circuits including a thermal printer. In such electronic equipment, when the power supply is switched from an old battery to the external power supply, a voltage difference therebetween may cause an adverse effect on the operation. For example, in a modern desk top calculator having a thermal printer, a power supply voltage for driving the thermal printer is measured by an arithmetic unit and a heating pulse for driving the thermal head having a duration corresponding to the measured power supply voltage is generated to keep print density at a constant level. In such a drive system, if the power supply voltage changes abruptly after the power supply voltage has been measured and the heating pulse duration for the thermal head has been determined, the operation of the thermal head is adversely affected.

For example, when the measured battery voltage is low because of long usage of the battery, the thermal head is driven by a long duration heating pulse in order to attain the constant level of the print density. If the power supply is switched by a power switch to an AC adaptor power supply having a higher voltage after the measurement of the battery voltage, the thermal head is driven by the long duration heat pulse with the higher voltage and, therefore, the thermal head may be broken.

When the power supply is switched by the power switch from the AC adaptor power supply to a new higher voltage battery power supply after the measurement of the voltage of the AC adaptor power supply, the thermal head may also be broken.

SUMMARY OF THE INVENTION

It is an object of the present invention to provide electronic equipment which prevents failure of operation when the power supply is changed.

It is another object of the present invention to provide electronic equipment in which breakage is prevented when the power supply is changed.

It is another object of the present invention to provide electronic equipment which is free from adverse effects in printing when the power supply is changed.

It is a further object of the present invention to provide electronic equipment of a simplified construction.

The above and other objects of the present invention will be apparent from the following description of the present invention.

DETAILED DESCRIPTION OF THE PREFERRED EMBODIMENTS

Figure 1:
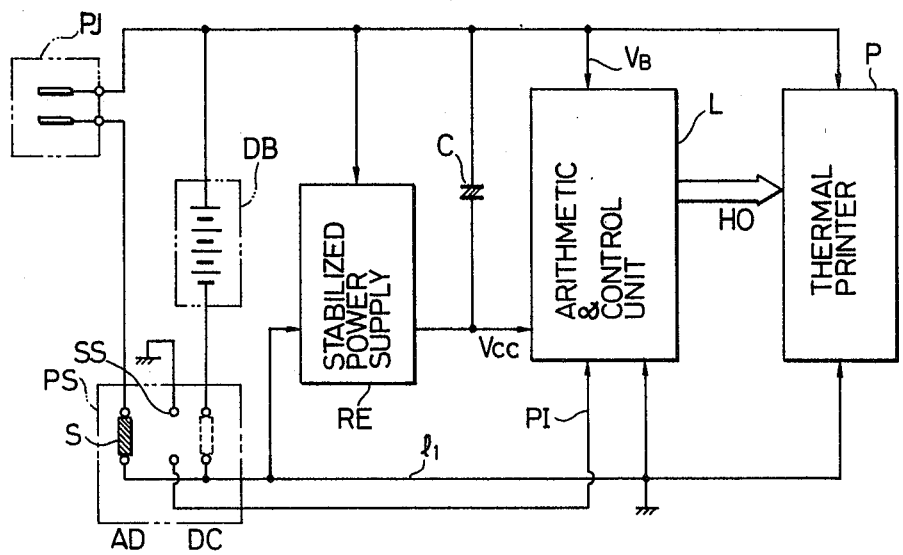
FIG. 1 is a block diagram of one embodiment of electronic equipment in accordance with the present invention.

FIG. 1 is a block diagram of one embodiment of electronic equipment in accordance with the present invention, which includes an electronic desk top calculator with a printer. PJ denotes an AC adaptor connecting jack, which constitutes connecting means, and power supply means removably connected to an external power supply to supply a power to the desk top calculator. DB denotes a dry battery which constitutes an internal power supply means removably mounted in the desk top calculator body to supply power thereto. The dry battery may be a rechargeable secondary battery or it may be nonremovably fixed to the desk top calculator body. PS denotes a power switch which constitutes switching means for selecting the AC adaptor power supply or the battery power supply as the power supply to the desk top calculator. The power switch PS has a metal contact piece S which can be switched to an AD position or a DC position. When the metal contact piece S is at the AD position, the AC adaptor power supply supplies power, and when it is at the DC position, the battery power supply supplies power. A contact SS which constitutes detecting means is located between the AD position and the DC position of the power switch PS. When the position of the metal contact piece S is switched, it moves past the detecting contact SS and a detection signal PI for indicating the switching is produced. L denotes an arithmetic and control unit of the desk top calculator, which carries out addition and subtraction operations, multiplication and division operations and other arithmetic operations necessary for the desk top calculator, and controls a thermal printer P, which constitutes print output means, through an output line HO to print out the input data and the operation results, as will be described later. The unit L also has a circuit which constitutes timer means for measuring the power supply such as a voltage to determine a heating pulse duration of an output instruction signal H1 to the thermal printer P. The arithmetic and control unit L is usually a one-chip LSI. RE denotes a stabilized power supply which stabilizes the battery power supply or the AC adaptor power supply to supply an LSI power supply voltage Vcc to the arithmetic and control unit L. C denotes a filtering capacitor connected across the power supply.

Figure 2:
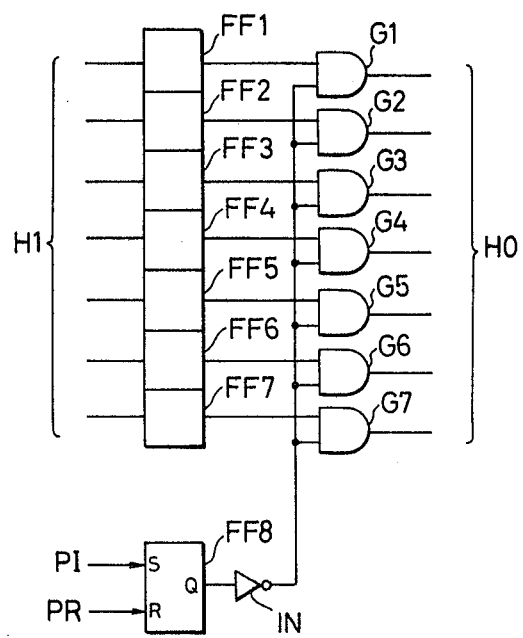
FIG. 2 is a circuit diagram for inhibiting a thermal head drive signal in accordance with the present invention.

FIG. 2 shows a circuit of the arithmetic and control unit L that controls the drive of the thermal heads which constitute printout means of an output means. In FIG. 2 FF1 to FF7 denote thermal head output instruction flip-flops which are set and reset by the head driving output instruction signal H1 generated by the arithmetic and control unit L. The number of the flip-flops corresponds to the number of the thermal heads. The outputs of the flip-flops FF1 to FF7 are supplied to first input terminals of corresponding AND gates G1 to G7, second input terminals of which are connected to an output terminal of a flip-flop FF8 through an inverter IN. The flip-flop FF8 constitutes inhibiting means which detects if the power switch PS is switched and, if it is switched, generates an inhibit signal to inhibit the output signal H1 from being supplied to the AND gates G1 to G7 to inhibit the print operation. The flip-flop FF8 is set to "1" by the detection signal PI and reset to "0" by an instruction signal PR from the arithmetic and control unit L prior to the printing of the next line. Accordingly, the flip-flop FF8 constitutes timer means which produces the "0" signal or the inhibit signal until the next line is to be printed, that is, for a time period longer than the duration of the output instruction signal H1.

In a normal printing condition, the flip-flop FF8 is reset to "0" and the output Q of the flip-flop FF8 is inverted by the inverter IN so that the "1" signal is supplied to the second inputs of AND gates G1 to G7. As a result, the AND gates G1 to G7 are opened and the thermal head drive signal H1 is supplied to the thermal printer P.

The AC adaptor (not shown) is connected to the jack PJ, and when the position of the power switch PS is at the DC position, the battery power supply is fed to the stabilized power supply RE and the arithmetic and control unit L of the desk top calculator and the thermal printer P. The arithmetic and control unit L carries out the operations in accordance with the keyed-in data and the results are printed out by the thermal printer P.

Under this condition, if the power switch PS is switched from the AD position to the DC position or vice versa to exchange the battery power supply and the external power supply, the detection signal PI is produced. As a result, the flip-flop FF8 is set to "1". The output of the flip-flop FF8 is inverted by the inverter IN which produces the "0" signal or the inhibit signal. As a result, the AND gates G1 to G7 are closed and the output instruction signal H1 is inhibited. Consequently, the thermal head drive signal is inhibited so that the thermal printer P is not driven. The flip-flop FF8 is reset to the normal state by the instruction signal PR from the arithmetic and control unit L before the next line is printed. By that time, the heating pulse duration of the output instruction signal has been measured based on the new power supply voltage.

Accordingly, the present embodiment is effective when the power supply voltage abruptly changes after the heating pulse duration has been determined, such as when the battery voltage is low because of long usage, the AC adaptor voltage is higher and the power switch PS is shifted to the AD position after the low battery voltage has been measured, or when the power switch PS is at the AD position to supply the AC adaptor power supply of a lower voltage than that of a new battery DB and the power switch PS in shifted from the AD position to the DC position.

Figure 3:
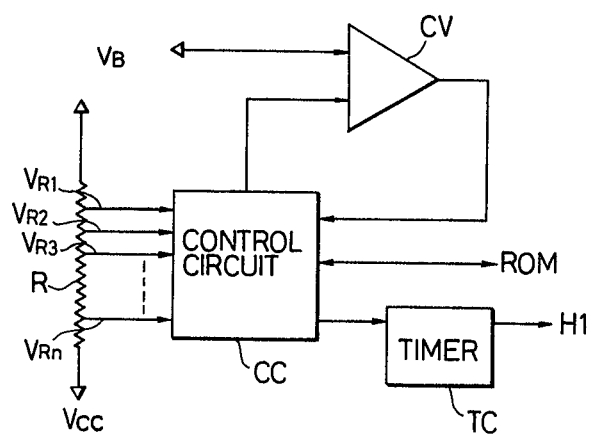
FIG. 3 shows a circuit diagram for determining the pulse duration of the thermal head drive signal.

FIG. 3 shows a voltage detection circuit included in the arithmetic and control unit L shown in FIG. 1 for detecting the power such as a voltage. In FIG. 3, Vcc denotes a reference voltage which is divided by a multi-tap resistor R to produce several reference voltages. $V_B$ denotes a voltage of the power supply being used or to be detected. CC denotes a control circuit which supplies the divided reference voltages to a voltage comparator CV in accordance with data codes supplied from a ROM. The voltage comparator CV compares the detected voltage $V_B$ with the divided reference voltages from the control circuit CC. For example, when the reference voltage Vcc is 10 volts and it is divided by ten by the resistor R, the control circuit CC supplies a voltage of VRn = 1 volt to the voltage comparator CV under the control of the data code from the ROM and the voltage comparator CV compares the detected voltage $V_B$ with the 1-volt reference voltage. If the detected voltage $V_B$ is higher, the control circuit CC supplies a voltage of VRn − 1 = 2 volts to the voltage comparator CV under the control of the data code from the ROM and the voltage comparator CV compares the detected voltage $V_B$ with the 2-volts reference voltage. The above comparison is repeated until the closest divided reference voltage to the detected voltage $V_B$ is determined, and the data code corresponding to the detected voltage $V_B$ sent to a timer circuit TC which constitutes timer means together with print data for specifying dots. The timer circuit TC determines a pulse width from the data code to produce the output instruction signal to the thermal heads.

While the illustrated embodiment inhibits the thermal head drive signal by the detection signal PI to stop or inhibit the print operation, it should be understood that other functions or operations of electronic equipment such as the display function or an operation function may be inhibited.

As described hereinabove, according to the present invention, when the external power supply and the internal power supply of electronic equipment are exchanged, the exchange is detected to inhibit the function of the electronic equipment. For example, when the print function is inhibited, the drive signal to the printout means is inhibited when the power supply is switched from a low voltage one to a high voltage one. Accordingly, a safe and reliable electronic equipment is provided.

What I claim is:

1. Electronic equipment that can be powered by an external power supply, comprising:
   an internal power supply contained in said electronic equipment for supplying power thereto;
   coupling means for coupling an external power supply for supplying power to said electronic equipment;
   means for generating a signal indicating change of power supply;
   switching means for selecting one of said internal power supply and an external power supply coupled to said coupling means to supply power to said electronic equipment, said switching means having a first position for connecting said internal power supply to said electronic equipment to be supplied with power therefrom, a second position for connecting said coupling means to said electronic equipment to be supplied with power from an external supply coupled to said coupling means, and a third position between said first position and said second position connected to said signal generating means; and
   inhibit means responsive to switching of said switching means to said third position for inhibiting at least one function of said electronic equipment.

2. Electronic equipment according to claim 1, further comprising printing means; means for producing an output signal for producing a printing function by said printing means; and control means for changing the waveform of the output signal in accordance with the magnitude of the power supplied to said electronic equipment.

3. An electronic equipment according to claim 1, wherein said inhibit means includes timer means for stopping inhibiting of said function a predetermined time period after the switching of said switching means.

4. Electronic equipment comprising:

first and second power supply means each for independently supplying power to said electronic equipment;

switching means for selecting one of said first power supply means and said second power supply means to supply the power to said electronic equipment;

detecting means for detecting the magnitude of power supplied by said first power supply means and second power supply means and generating a detection signal representative thereof;

first timer means for generating an output signal of a predetermined duration in accordance with the detection signal generated by said detecting means, said output signal controlling a function of said electronic equipment; and second timer means responsive to the switching of said switching means for generating an inhibit signal of a longer duration than said predetermined duration to inhibit said output signal.

5. An electronic equipment according to claim 4, further comprising printing means driven by said output signal.

6. An electronic equipment according to claim 4, wherein said detecting means includes reference power means for setting a plurality of reference powers and compare means for comparing the detected powers of said first and second power supply means with said reference powers.

7. Electronic equipment that can be powered by an external power supply, comprising:

an internal power supply contained in said electronic equipment for supplying power thereto;

coupling means for coupling an external power supply for supplying power to said electronic equipment;

switching means for selecting one of said internal power supply and an external power supply coupled to said coupling means to supply power to said electronic equipment; and inhibit means responsive to switching of said switching means for inhibiting at least one function of said electronic equipment, said inhibit means including timer means for stopping inhibiting of said function a predetermined time period after the switching of said switching means.

* * * * *